United States Patent [19]

Yamada et al.

[11] 4,327,380

[45] Apr. 27, 1982

[54] CONTROL METHOD FOR REPRODUCTION PICTURE POSITIONS IN A DIRECTION OF A CYLINDER'S AXIS

[75] Inventors: Mitsuhiko Yamada; Toshiaki Nakade, both of Kyoto, Japan

[73] Assignee: Dainippon Screen Seizo Kabushiki Kaisha, Japan

[21] Appl. No.: 179,697

[22] Filed: Aug. 20, 1980

[30] Foreign Application Priority Data

Aug. 24, 1979 [JP] Japan .............................. 54-107884

[51] Int. Cl.³ ............................................ H04N 1/36
[52] U.S. Cl. .................................... 358/264; 358/268; 358/287; 358/288; 358/289; 358/256
[58] Field of Search ............... 358/256, 268, 264, 285, 358/287, 286, 288, 289, 300, 276, 277, 278, 279; 346/103, 115, 125, 127, 132, 138, 139

[56] References Cited

U.S. PATENT DOCUMENTS

| | | | |
|---|---|---|---|
| 3,013,121 | 12/1961 | Castor | 358/277 |
| 3,778,544 | 12/1973 | Richter | 358/287 |
| 3,975,761 | 8/1976 | Taudt et al. | 358/280 |
| 4,010,320 | 3/1977 | Kudlich | 358/287 |
| 4,214,276 | 7/1980 | Pugsley et al. | 358/256 |
| 4,254,439 | 3/1981 | Fowler et al. | 358/268 |

FOREIGN PATENT DOCUMENTS 2836194  1/1979 Fed. Rep. of Germany ...... 358/287

OTHER PUBLICATIONS

L. S. Childress, Continuously Variable Resolution Document Scanner and Film Plotter, Jan. 1976, IBM Technical Disclosure Bulletin, vol. 18, No. 8, pp. 2580–2581.

Primary Examiner—Robert L. Richardson
Assistant Examiner—Edward L. Coles
Attorney, Agent, or Firm—Ostrolenk, Faber, Gerb & Soffen

[57] ABSTRACT

A method for controlling positions of reproduction pictures on a recording film mounted to a recording cylinder in the direction of the cylinder's axis, for use in a picture reproducing machine, wherein distances of pickup and recording heads away from a scanning start point of each original picture and a recording start point of each reproduction picture are detected on the basis of a standard position through which the recording head is moved at a fixed speed, and wherein the moving speed of the pickup head is controlled according to the distances detected and each reproduction scale so that the scanning start point of the original picture and the recording start point of the reproduction picture may be scanned at substantially the same time by the pickup and the recording heads.

3 Claims, 11 Drawing Figures

CONTROL METHOD FOR REPRODUCTION PICTURE POSITIONS IN A DIRECTION OF A CYLINDER'S AXIS

BACKGROUND OF THE INVENTION

This invention relates to a method for controlling positions of reproduction pictures on a recording film mounted to a recording cylinder in the direction of the cylinder's axis, for use in a picture reproducing machine, such as a color scanner, or a color facsimile.

A picture reproducing machine such as a color scanner, wherein a plurality of original pictures mounted to a picture cylinder are scanned by a pickup head to obtain picture signals, wherein reproduction pictures with variable reproduction scales are recorded exactly by a recording head on a recording film mounted to a recording cylinder in the desired layout positions by using the picture signals according to the desired trimming of the pictures, has not been developed yet. One of the reasons is a fact that the positions of the reproduction pictures on the recording film in the direction of the recording cylinder's axis cannot be precisely controlled.

For example, in a conventional picture scanning and recording machine the moving speed of the recording head in the direction of the recording cylinder's axis is fixed, but, while the picture are scanned photoelectrically, the moving speed of the pickup head in the same direction is varied depending on the reproduction scale, thereby changing the reproduction scale of the reproduction picture in the direction of the recording cylinder's axis.

However, in this embodiment, the response time to the voltage supplied to a motor for driving the pickup head is not stable, i.e. the time the motor comes up to a speed corresponding to the voltage supplied after changing the supply voltage depends on the voltage before the supply, the difference between the voltages before and after the supply, and so forth, and thus the starting point of the reproduction picture in the direction of the recording cylinder's axis is shifted several by scanning lines.

SUMMARY OF THE INVENTION

It is an object of the present invention to provide a method for controlling position of reproduction pictures on a recording film mounted to a recording cylinder in the direction of the cylinder's axis, for use in a picture reproducing machine, free from the aforementioned defects, which is capable of precise positioning of the reproduction pictures on the recording film, and is stable and reliable.

According to the present invention there is provided a method for controlling positions of reproduction pictures on a recording film mounted on a recording cylinder in the direction of the cylinder's axis, for use in a picture reproducing machine, comprising the steps of (a) detecting the distances of pickup and recording heads from a scanning start point of each original picture and a recording start point of each reproduction picture, respectively, on the basis of a standard position through which the recording head is moved at a fixed speed, and (b) controlling the moving speed of the pickup head according to the distances detected and reproduction scales which vary as a function of said distances so that the scanning start point of the original picture and the recording start point of the reproduction picture are scanned at substantially the same instant by the pickup and the recording heads, respectively.

BRIEF DESCRIPTION OF THE DRAWINGS

In order that the present invention may be better understood, a preferred embodiment will now be described with reference to the accompanying drawings, in which.

DESCRIPTION OF A PREFERRED EMBODIMENT

Figure 1:
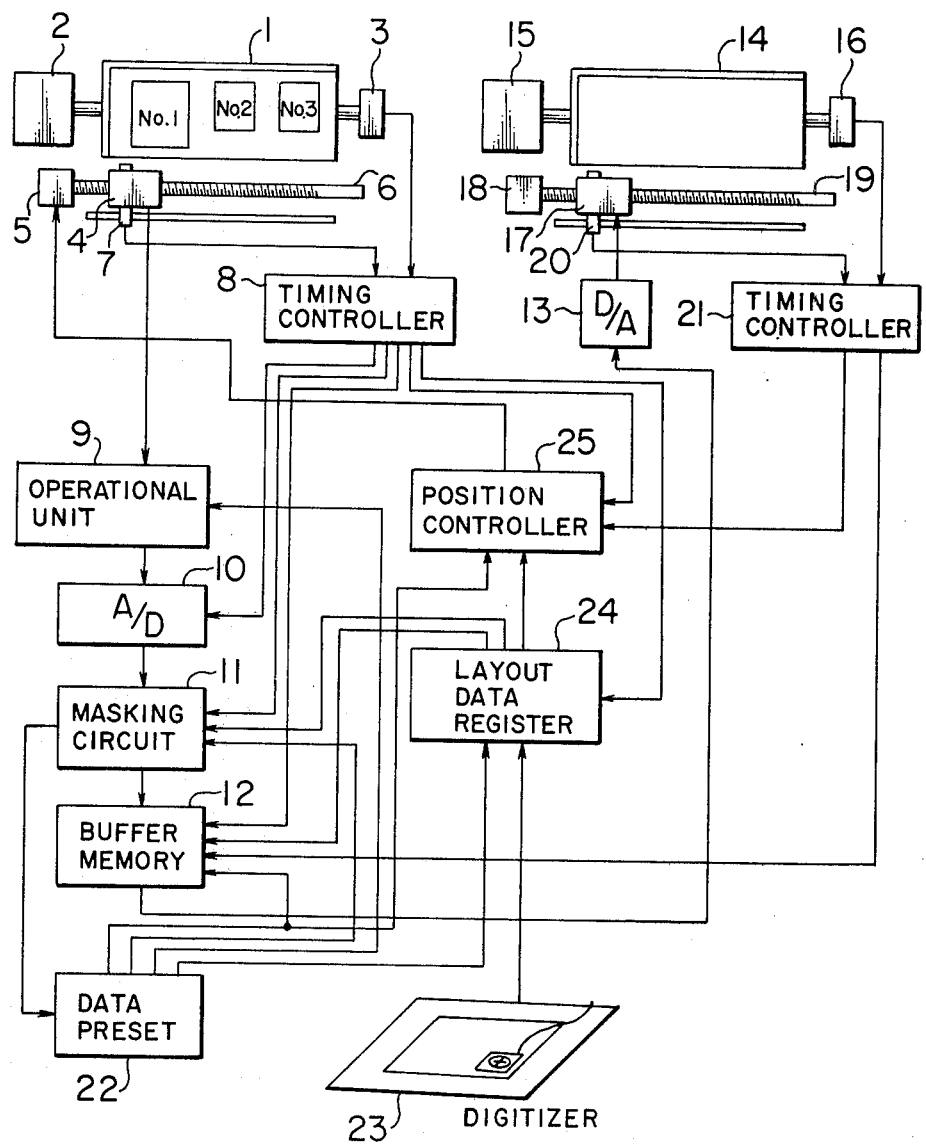
FIG. 1 is a schematic view of a picture reproducing machine in which a method according to the present invention is applied.

Referring now to the drawings there is shown in FIG. 1 a picture reproducing machine such as a color scanner, wherein a method according to the present invention is applied, which is capable of recording reproduction pictures with variable reproduction scales on a recording film in the desired layout positions according to the desired trimming of the pictures.

A picture cylinder 1 and a recording cylinder 14 are rotated at certain speeds by synchronous motors 2 and 15. Original pictures No. 1–No. 3 mounted to the picture cylinder 1 are consecutively scanned photoelectrically by a pickup head 4 which is moved by a motor 5 along a screw rod 6 in the direction of the picture cylinder's axis, to obtain picture signals which are input to an operational unit 9.

The operational unit 9 of a conventional type used in a conventional color scanner, operates color control conditions such as logarithmic conversion, color correction, gradation control, sharpness emphasis control, and so forth. Color control conditions for each original picture are settled from a data preset circuit 22 to the operational unit 9 by a timing pulse sent from a masking circuit 11. The picture signals operated in the operational unit 9 are then sent to an analog-digital converter 10, hereinafter referred to as A/D converter 10.

In the A/D converter 10 the picture signals are converted into digital picture signals using a sampling pulse which is produced in a timing controller 8 on the basis of clock pulses generated by a rotary encoder 3 and a linear encoder 7. The digitalized picture signals are fed to the masking circuit 11.

Figure 2:
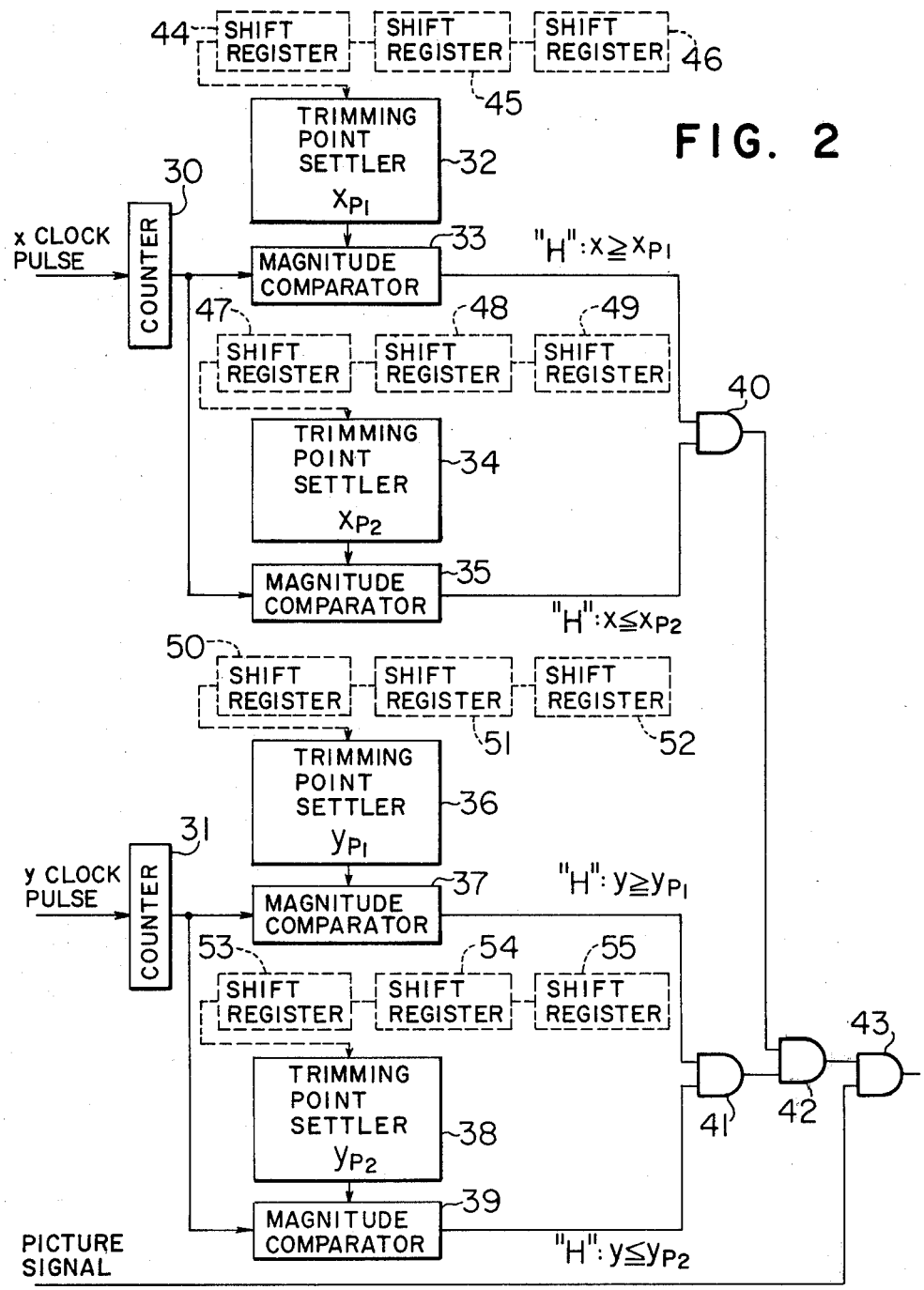
FIG. 2 is a block diagram of a masking circuit in FIG. 1.
Figure 3A:
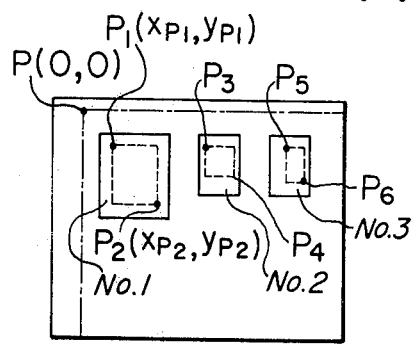
FIGS. 3a and 3b show original pictures mounted on a picture cylinder exploded and a block copy mounted on a digitizer table.

In FIG. 2 is shown one embodiment of the masking circuit 11 comprising pulse counters 30 and 31, trimming point settlers 32, 34, 36 and 38, magnitude comparators 33, 35, 37 and 39, and AND gates 40–43. Each trimming point settler 32, 34, 36 or 38 is connected to shift registers 44–46, 47–49, 50–52 or 53–55 in the data preset circuit 22. In the shift registers 44–55, distances from an origin P(0,0), which represent coordinates of trimming points $P_1$, $P_2$, $P_3$, $P_4$, $P_5$ and $P_6$ of the original pictures No. 1–No. 3 mounted on the picture cylinder 1 exploded, as shown in FIG. 3a, are stored as pulse numbers.

For example, in the shift registers 44 and 47, the distances corresponding to the coordinates $x_{p1}$ and $x_{p2}$ in the X axis of the trimming points $P_1$ and $P_2$ of the original picture No. 1 are stored as pulse numbers, and in the shift registers 50 and 53, the distances corresponding to the coordinates $y_{p1}$ and $y_{p2}$ in the Y axis of the trimming points $P_1$ and $P_2$ of the same picture are stored as pulse numbers. The coordinates of the trimming points of the original pictures are detected by a viewer (not shown) attached to the pickup head 4 in advance, and are stored in the data preset circuit 22 together with the reproduction conditions and the reproduction scales of the original pictures.

In the other shift registers 45, 48, 51 and 54 or 46, 49, 52 and 55, the distances corresponding to the coordinates of the trimming points of the original pictures No. 2 and No. 3 are stored as pulse numbers in the same manner as described above. Each shift register in the data preset circuit 22 is controlled by a shift pulse at the same timing as the reproduction conditions of each original picture are settled in the operational unit 9, that is, before each original picture is scanned photoelectrically.

The magnitude comparator 33 outputs a high level signal H when the pulse member of x clock pulses which are generated by the timing controller 8 and are counted by the pulse counter 30, is at least the value set in the trimming point settler 32. The other magnitude comparators 35, 37 and 39 output the high level signals H when the pulse number of the x clock pulses is at most the value set in the trimming point settler 34, when the pulse number of y clock pulses is at least the value set in the trimming point settler 36, and when the pulse number of the y clock pulses is at most the value set in the trimming point settler 38, in the same manner as above.

Accordingly, the picture signals corresponding to the trimming parts of the original pictures No. 1–No. 3, as shown by broken lines in FIG. 3a, are output in order of the scanning lines from the masking circuit 11. The picture signals output from the masking circuit 11 are written in addresses addressed by a digitizer 23, of a buffer memory 12 which constitutes a magnification settler, by a writing pulse generated by the timing controller 8.

Figure 3B:
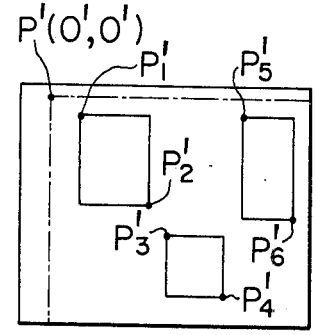

The addressing of the addresses of the buffer memory 12 is carried out by the digitizer 23 as follows. A block copy in which the original pictures No. 1–No. 3 are arranged according to the desired reproduction scales and the desired layout, is mounted to a digitizer table on which an origin P' (0',0') corresponding to the origin of the recording cylinder 14 is fixed, as shown in FIG. 3b. Then, coordinates $(x_{p1}', y_{p1}')$, $(x_{p2}', y_{p2}')$, . . . , $(x_{p6}', y_{p6}')$ of points $P_1'$, $P_2'$, . . . , $P_6'$ of the reproduction pictures on the block copy, which correspond to the trimming points $P_1$, $P_2$, . . . , $P_6$ of the original pictures, are read by a cursor, and are stored in an address memory of a layout data register 24. The picture signals picked up between the points $P_1$ and $P_2$ of the original picture No. 1 are written consecutively in the addresses in the buffer memory 12, corresponding to the coordinates $y_{p1}'-y_{p2}'$ in the Y direction on the digitizer 23.

The buffer memory 12 which constitutes the magnification settler has a capacity corresponding to one scanning line of the recording cylinder 14 in the direction of its periphery, and its address number 0 corresponds to the origin on the surface of the recording cylinder 14 in the direction of its periphery. The read-out of the picture signals out of the buffer memory 12 is carried out in order of addresses from the address number 0 by a reading pulse which is produced in a timing controller 21 from the clock pulses generated by a rotary encoder 16 which is coaxially mounted to the recording cylinder 14 and a linear encoder 20 attached to a recording head 17 depending on the desired reproduction scale.

The picture signals read out of the buffer memory 12 are sent to the digital-analog converter 13, hereinafter referred to as D/A converter 13, and are converted there into analog picture signals. The analog picture signals are fed to the recording head 17 which is driven by a motor 18 via a screw rod 19. Then the recording head 17 controls the exposure light and records the reproduction pictures on the recording film mounted on the recording cylinder 14.

In this case, however, the relation between the coordinates $x_{p1}'$, $x_{p2}'$, . . . , $x_{p6}'$ on the block copy, read by the digitizer 23, and those $x_{p1}$, $x_{p2}$, . . . , $x_{p6}$ of the trimming points of the original pictures, i.e. the relation of the positions in the direction of the cylinder's axis between the original pictures and the reproduction pictures corresponding thereto, is not determined, and thus the precise layout of the reproduction pictures cannot be performed.

According to the present invention, the position control of the reproduction pictures in the direction of the cylinder's axis is carried out as follows.

Figure 4A:
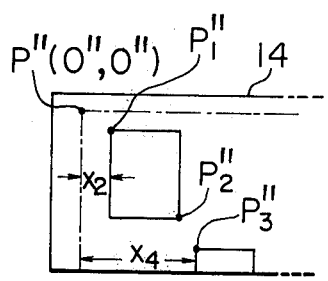
FIGS. 4a and 4b show parts of a recording cylinder exploded and a picture cylinder exploded, respectively.
Figure 4B:
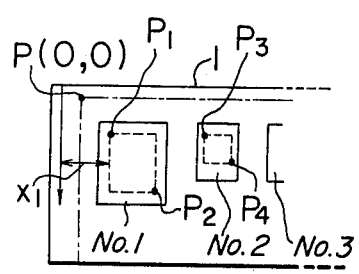
Figure 5:
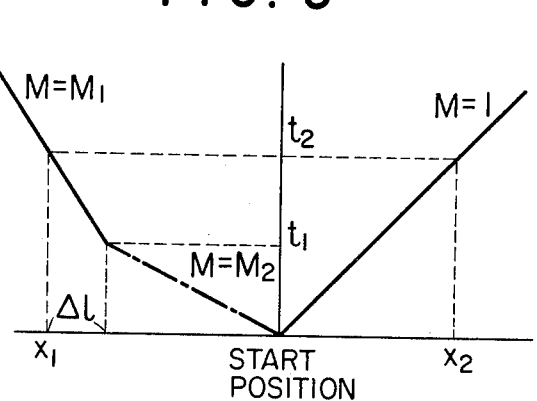
FIG. 5 is a graph showing moving speeds of pickup and recording heads.

Assuming that, when the recording head 17 scans the origin P'' (0'', 0'') of the recording cylinder 14, which is positioned at a distance $x_2$ before a point $P_1''$ corresponding to the trimming point $P_1$, as shown in FIG. 4a, the pickup head 4 scans the front position which is positioned at a distance $x_1$ before the trimming point $P_1$ of the original picture on the picture cylinder 1, as shown in FIG. 4b, the moving speeds of the pickup head 4 and the recording head 17 are shown in FIG. 5 wherein the distance (absolute value) in the direction of the cylinder's axis and the time are indicated in the horizontal and the vertical axes.

When the recording head 17 is moved the distance $x_2$ in a time $t_2$, the pickup head 4 should be moved the distance $x_1$ in a time $t_1$. In addition, after the trimming point $P_1$ shown in FIG. 4b, i.e. after the distance $x_1$, the pickup head 4 should be moved at the fixed speed corresponding to a reproduction scale $M_1$. However, if the voltage supplied to the motor 5 for driving the pickup head 4 is changed in order to change the rotation number, it takes a certain time $t_2-t_1$ for the motor 5 become stable at the new rotation number while the pickup head 4 moves the distance $\Delta l$ (in practice this may be a fixed number). Hence, in expectation of this distance $\Delta l$, the voltage for the motor 5 must be changed by the time $t_1$ after the start.

If at the time $t_1$ after the start, the motor is supplied with the voltage corresponding to the magnification scale $M_1$ so as to change the moving speed of the pickup head 4, corresponding to the magnification scale $M_1$, a magnification scale $M_2$ corresponding to the moving speed of the pickup head 4 from the start position will be obtained in the following. In this case, of course, it is assumed that the motors 18 and 5 for driving the recording and the pickup heads 17 and 4 are maintained to the stable rotation numbers from the start positions.

If the rotation number of the recording cylinder 17 is R (a fixed value), and the moving distance of the recording head 17 in the direction of the cylinder's axis during one rotation of the recording cylinder 14 is L (a fixed value), the time $t_2$ is shown as follow.

$$t_2 = \frac{x_2}{R \cdot L} \text{ (when } M \text{ equals one)} \quad (1)$$

Since, when the reproduction scale is $M_1$, the moving speed of the pickup head 4 is $(R \cdot L)/M_1$, $$t_2 - t_1 = \frac{M_1}{R \cdot L} \cdot \Delta l$$

$$\text{Thus, } t_1 = t_2 - \frac{M_1}{R \cdot L} \cdot \Delta l \quad (2)$$

$$\text{Further, } x_1 - \Delta l = \frac{R \cdot L}{M_2} \cdot t_1 \quad (3)$$

Therefore, the magnification $M_2$ is obtained from the above formula (1), (2) and (3) by eliminating $t_1$ and $t_2$ as follows:

$$M_2 = \frac{x_2 - \Delta l \cdot M_1}{x_1 - \Delta l}$$

From this result, it is readily understood that the pickup head 4 is first moved at a speed corresponding to the magnification $M_2$ in the direction of the cylinder's axis until it reaches to $x_1 - \Delta l$, and that, when it is reached to $x_1 - \Delta l$, the magnification is changed to $M_1$ and a position controller 25 (see FIG. 1) is actuated in order to control the correction voltage to be supplied to the motor 5 so that the scanning of a certain point of the original picture and the recording of the point corresponding to the certain point of the reproduction picture may be carried out at substantially the same time, thereby positioning the reproduction picture in the direction of the cylinder's axis.

Figure 6:
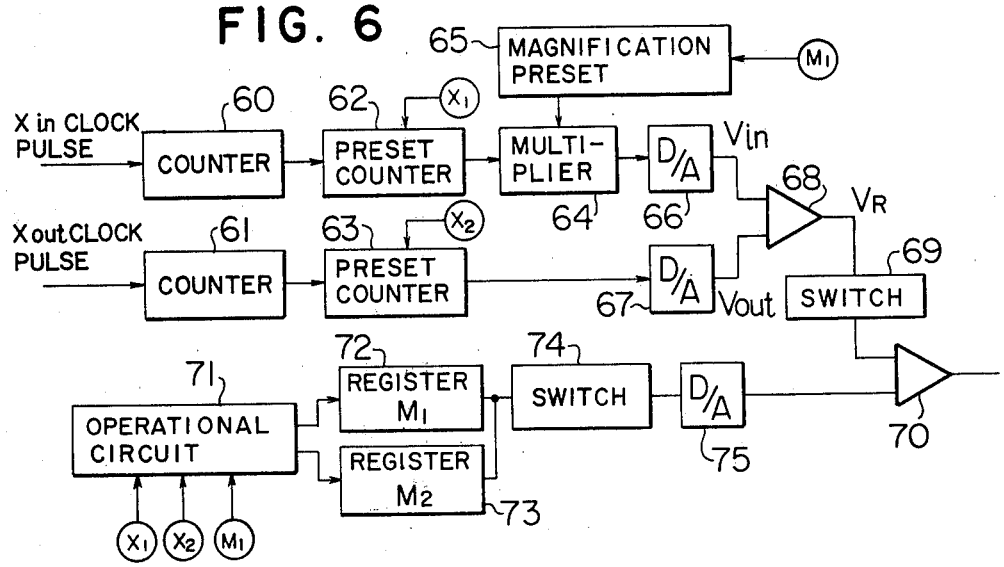
FIG. 6 is a block diagram of one embodiment of a position controller in FIG. 1.

In FIG. 6 there is shown one embodiment of the position controller 25 comprising pulse counters 60 and 61, preset counters 62 and 63 connected thereto, a multiplier 64, a magnification preset circuit 65, D/A converters 66, 67 and 75, a differential amplifier 68, switch circuits 69 and 74, an adder 70, an operational circuit 71 such as a central processing unit (CPU), and registers 72 and 73.

In order to move the pickup head 4 at the speed corresponding to the magnification $M_2$ in the direction of the cylinder's axis until it is reached to $x_1 - \Delta l$, as described above, in the position controller 25, the voltages corresponding to the reproduction scales $M_1$ and $M_2$ are operated in the operational circuit 71 according to the data fed from the data preset circuit 22 and the layout data register 24 in advance, and are written in the registers 72 and 73 in advance.

The switch circuit 74 is controlled so that, before the pickup head reaches $x_1 - \Delta l$ and after it reaches $x_1 - \Delta l$, the voltage corresponding to the reproduction scale $M_2$ and the voltage corresponding to the reproduction scale $M_1$ may be sent from the register 73 and the register 72 to the adder 70 via the D/A converter 75.

On the other hand, until the pickup head 4 reaches the point $x_1 - \Delta l$, the switch circuit 69 is opened, and thus the voltage corresponding to the reproduction scale $M_2$ is supplied from the adder 70 to the motor 5 so as to move the pickup head 4 at the speed corresponding to the reproduction scale $M_2$ in the direction of the cylinder's axis.

When the pickup head 4 reaches the point to $x_1 - \Delta l$, the voltage corresponding to the reproduction scale $M_1$ and the correction voltage to be supplied to the motor 5 are obtained as follows.

The counters 60 and 61 count $x_{in}$ and $x_{out}$ clock pulses, respectively, each being generated by the timing controller 8 or 21 per single rotation of the picture or the recording cylinder 1 or 14. In the preset counters 62 and 63, in which, for example, in case of the one shown in FIG. 4, the values $x_1$ and $x_2$ are stored, these values $x_1$ and $x_2$ are subtracted by the $x_{in}$ and the $x_{out}$ clock pulses, thereby outputting signals $x_1 - x_{in}$ and $x_2 - x_{out}$.

The signal $x_2 - x_{out}$ output from the preset counter 63 is sent to the D/A counter 67 and is converted there into an analog voltage signal Vout. The signal $x_1 - x_{in}$ output from the preset counter 62 is sent to the multiplier 64 and is multiplied by the reproduction scale $M_1$ which is settled in the magnification preset circuit 65. Then, the multiplied signal is fed to the D/A converter 66 and is converter there into an analog voltage signal Vin.

The signals Vin and Vout corresponding to $M_1(x_1 - x_{in})$ and $x_2 - x_{out}$ are sent to the differential amplifier 68 wherein the operation of Vout-Vin, i.e. $x_2 - x_{out} - M_1(x_1 - x_{in})$ is performed to obtain a signal $V_R$. The output signal $V_R$ from the differential amplifier 68 is controlled by the switch circuit 69 to be passed therethrough to one terminal of the adder 70 when the pickup head 4 is positioned the points between $x_1 - \Delta l$ and $x_1$, the moving speed of the pickup head 4 is controlled so that the signal $V_R$ may be nought.

Meanwhile, after the pickup head 4 reaches the point to $x_1 - \Delta l$, the voltage corresponding to the reproduction scale $M_1$ is supplied from the register 72 to the other terminal of the adder 70 through the D/A converter 75 by controlling the switch circuit 74, as described above.

Therefore, when the pickup head 4 is moved from $x_1 - \Delta l$ to $x_1$, a voltage $V_{M1}$ corresponding to the reproduction scale $M_1$ and the correction voltage $V_R$ are supplied to the motors, so that in substantially the same time as the pickup head 4 is moved at the distance $x_1$ on the original picture No. 1, the recording head 17 may be moved the distance $x_2$ on the recording film, and after the pickup head 4 moves the distance $x_1$, the voltage corresponding to the reproduction scale $M_1$ is supplied to the motor, so that the pickup head 4 may be moved at the speed corresponding to the reproduction scale $M_1$.

In the preset counter 63 and the operational circuit 71, the values corresponding to the coordinates of the x direction, which are read by the digitizer 23, at the points $P_1'$, $P_3'$ and $P_5'$ (see FIG. 3) on the block copy are stored. In the preset counter 62 and the operational circuit 71, when the recording head 17 is positioned in the positions corresponding to the points $P_1'$, $P_3'$ and $P_5'$ on the block copy, the values corresponding to the scanning positions of the pickup head 4 are stored.

The values to be stored to the preset counters 62 and 63 and the operational circuit 71 may be obtained in advance and may be stored in the layout data register 24. Then, when the recording head 17 is moved to the certain position, for example, the recording head 17 is at the position $x_4 - \Delta l$ in FIG. 4, wherein $\Delta l$ corresponding to the response time of the motor may be a fixed value without trouble, the values corresponding to the following reproduction picture may be settled.

The reproduction scales are settled from the data preset circuit 22 to the magnification preset circuit 65 and the operational circuit 71 in the same timing as the desired values are settled to the preset counters 62 and 63.

The switchovers of the switch circuits 69 and 74 may be controlled by a detect signal generated by a position detector (not shown) included in the timing controller 21, for example, when the pickup head 4 is positioned in $x_1 - \Delta l$ and $x_1$.

Figure 7:
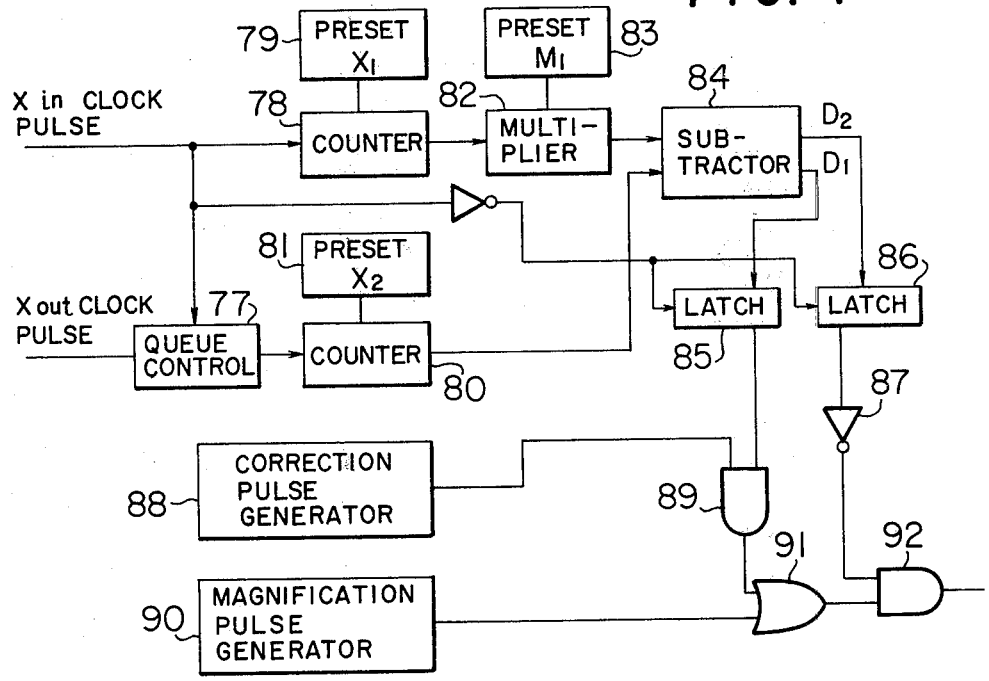
FIG. 7 is a block diagram of another embodiment of a position controller in FIG. 1.

In FIG. 7 there is shown another embodiment of a position controller 25 in FIG. 1, comprising a queue control circuit 77, pulse counters 78 and 80, preset circuits 79, 81 and 83, a multiplier 82, a subtractor 84 having a magnitude descriminating function, latch circuits 85 and 86, an inverter 87, a correction pulse generator 88, AND gates 89 and 92, a magnification pulse generator 90, and an OR gate 91.

Before the pickup head 4 is reached to $x_1 - \Delta l$, a pulse signal having a frequency corresponding to a reproduction scale $M_2$, which is generated by the magnification pulse generator 90, is supplied to the motor 5 via the OR gate 91 and the AND gate 92 so that the pickup head 4 may be moved at the speed corresponding to the reproduction scale $M_2$ in the direction of the cylinder's axis.

Then, when the pickup head 4 is reached to $x_1 - \Delta l$, in the pulse counter 78, the value $x_1$ sent from the preset circuit 79 is subtracted by the $x_{in}$ in clock pulses, and the pulse counter 78 outputs the signal $x_1 - x_{in}$ to the multiplier 82 in which the signal $x_1 - x_{in}$ is multiplied by the reproduction scale $M_1$ settled in the preset circuit 83. The signal $M_1(x_1 - x_{in})$ multiplied is fed to one terminal of the subtractor 84.

On the other hand, in the pulse counter 80 the value $x_2$ sent from the preset circuit 81 is subtracted by the $x_{out}$ clock pulses which are fed to the pulse counter 80 via the queue control circuit 77, and the pulse counter 80 sends the signal $x_2 - x_{out}$ to the other terminal of the subtractor 84.

In the subtractor 84 the operation of $x_2 - x_{out} - M_1(x_1 - x_{in})$ is performed, and, when the result of the operation is positive or negative, the subtractor 84 outputs a high level signal H to an output terminal $D_1$ or $D_2$. That is, when the high level signal H is output to the terminal $D_1$, the moving speed of the pickup head 4 is slower than the desired moving speed. In this case, while the high level signal H is output to the terminal $D_1$, a correction pulse signal generated by the correction pulse generator 88 is sent to the OR gate 91 via the AND gate 89 and is added there to the pulse signal corresponding to the reproduction scale $M_1$, which is generated by the magnification pulse generator 90. The output signal from the OR gate 91 is sent to the motor 5 via the AND gate 92, thereby increasing the moving speed of the pickup head 4.

When the high level signal H is output to the terminal $D_2$, the moving speed of the pickup head 4 is faster than the desired moving speed. In this case, while the high level signal H is output to the terminal $D_2$, the pulse signal corresponding to the magnification scale $M_1$, which is generated by the magnification pulse generator 90, and is to be supplied to the motor 5, is stopped by the AND gate 92, thereby reducing the moving speed of the pickup head 4.

Accordingly, the moving speed of the pickup head 4 is controlled so that the pickup head 4 may be moved the distance $x_1$ on the original picture No. 1, and in substantially the same time the recording head 17 may be moved the distance $x_2$ on the recording film.

When a plurality of original pictures are to be reproduced, as shown in FIG. 4, the preset circuits 78, 80 and 83 are cleared after the first original picture is processed, and then the reproduction conditions and the reproduction scale for the next original picture are settled in the preset circuits.

The latch circuits 85 and 86 latch the output signals of the subtractor 84 by a latch pulse for a short enough time that the pulse counters 78 and 80 and the subtractor 84 output the stable results. The latch pulse is produced from the leading edge of the $x_{in}$ clock pulse.

When the input timings of the $x_{in}$ clock pulse and the $x_{out}$ and clock pulse overlap, the operation in the subtractor 84 becomes unstable and thus incorrect operational results may be latched in the latch circuits 85 and 86. In such a case, the queue control circuit 77 controls the timing of the $x_{out}$ clock pulse so that the $x_{in}$ and the $x_{out}$ clock pulses may not overlap.

Figure 8:
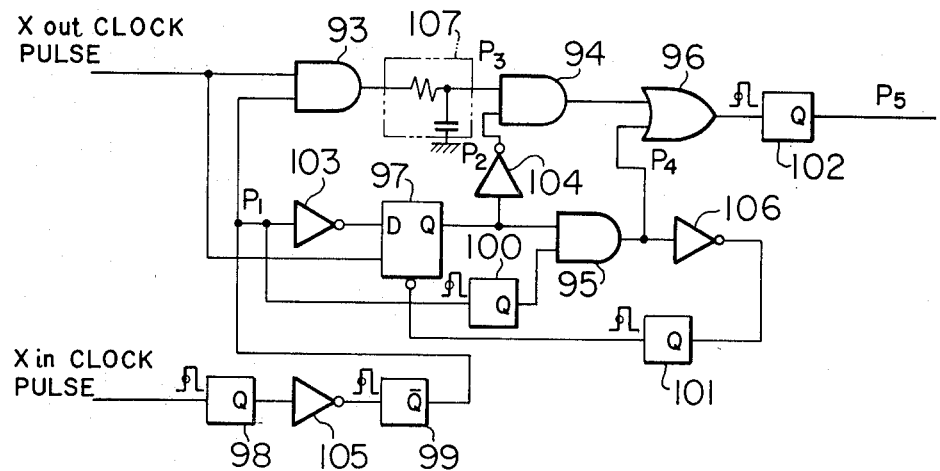
FIG. 8 is a block diagram of one embodiment of a queue control circuit in FIG. 7.

In FIG. 8 is shown one embodiment of the queue control circuit 77 of a conventional type comprises a combination of AND gates 93–95, an OR gate 96, a D-type flip-flop circuit 97, one-shot multivibrators 98–102, inverters 103–106, and a delay circuit 107.

Figure 9:
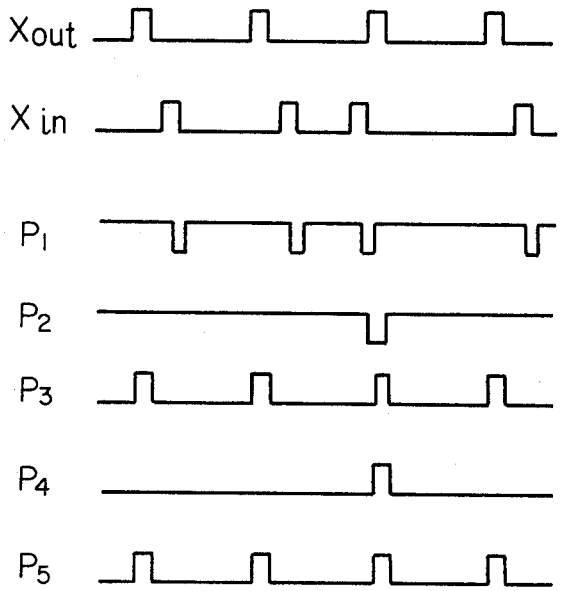
FIG. 9 is a time chart of pulse signals appeared in FIG. 8.

In FIG. 9 is shown a time chart of pulse signals appeared in FIG. 8. When the trailing edge of the $x_{in}$ clock pulse overlaps the leading edge of the $x_{out}$ clock pulse, as shown in FIG. 9, the timing of the $x_{out}$ clock pulse is somewhat delayed or shifted so that the timing of the $x_{in}$ and the $x_{out}$ clock pulses may be separated at a short distance.

The $x_{out}$ clock pulse is sent to one terminal of the AND gate 93 and the flip-flop circuit 97. From the $x_{in}$ clock pulse a pulse signal $P_1$ is produced by the one-shot multivibrator 98, the inverter 105 and the one-shot multivibrator 99, and is fed to the other terminal of the AND gate 93 and the D-terminal of the flip-flop circuit 97 via the inverter 103.

An output signal from the AND gate 93 is delayed by the delay circuit 107 to output a signal $P_3$ to one terminal of the AND gate 94. An output signal from the flip-flop circuit 97 is inverted by the inverter 104, and an output signal $P_2$ of the inverter 104 is sent to the other terminal of the AND gate 94. The output signal of the flip-flop circuit 97 is also fed to one terminal of the AND gate 95, and the signal $P_1$ is sent to the other terminal of the AND gate 95 via the one-shot multivibrator 100.

An output signal from the AND gate 94 and an output signal $P_4$ from the AND gate 95 are fed to the OR gate 96. An output signal from the OR gate 96 is passed through the one-shot multivibrator 102 to obtain a pulse signal $P_5$ which is sent to the counter 80.

The output signal $P_4$ is sent to the flip-flop circuit 97 via the inverter 106 and the one-shot multivibrator 101 in order to reset the flip-flop circuit 97.

Although the present invention has been shown and described in terms of a preferred embodiment thereof, however, various changes and modifications can be made by those skilled in the art without departing from the scope of the present invention. For example, the picture cylinder and the recording cylinder can be coupled and be driven by one motor.

What is claimed is:

1. A method for controlling the position at which pictures are reproduced on a recording film mounted on a recording cylinder in the direction of the cylinder's axis, for use in a picture reproducing machine, comprising the steps of:
   (a) detecting the distances of a pickup and a recording head from a scanning start point of each original picture and a recording start point of each reproduction picture, respectively, on the basis of a standard position through which the recording head is moved at a fixed speed; and
   (b) controlling the moving speed of the pickup head according to the distances detected and reproduction scales which vary as a function of said distances so that the scanning start point of the original picture and the recording start point of the reproduction picture are scanned at substantially the same instant by the pickup and the recording heads, respectively.

2. A method as claimed in claim 1, wherein the moving speed of the pickup head is changed before it reaches the scanning start point of the original picture.

3. A method as claimed in either claim 1 or 2, wherein the standard position is the recording start point of the reproduction picture.

* * * * *